(12) United States Patent
Nagamine

(10) Patent No.: US 9,343,108 B2
(45) Date of Patent: May 17, 2016

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventor: Takeshi Nagamine, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 116 days.

(21) Appl. No.: 14/150,224

(22) Filed: Jan. 8, 2014

(65) Prior Publication Data

US 2014/0321833 A1 Oct. 30, 2014

(30) Foreign Application Priority Data

Apr. 24, 2013 (JP) .................... 2013-091533

(51) Int. Cl.
*G11B 27/00* (2006.01)
*H04N 5/93* (2006.01)
*G11B 27/031* (2006.01)
*G11B 27/10* (2006.01)
*G11B 27/34* (2006.01)

(52) U.S. Cl.
CPC .............. *G11B 27/031* (2013.01); *G11B 27/10* (2013.01); *G11B 27/34* (2013.01)

(58) Field of Classification Search
CPC ...................................................... G11B 27/34
USPC ......................................... 386/282, 287, 290
See application file for complete search history.

(56) References Cited

U.S. PATENT DOCUMENTS

2007/0118873 A1* 5/2007 Houh et al. .................... 725/136
2010/0129057 A1* 5/2010 Kulkarni ......................... 386/95

FOREIGN PATENT DOCUMENTS

JP 2001-209361 A 8/2001

* cited by examiner

*Primary Examiner* — Hung Dang
*Assistant Examiner* — Girumsew Wendmagegn
(74) *Attorney, Agent, or Firm* — Sughrue Mion, PLLC

(57) ABSTRACT

An information processing apparatus includes a display, a selecting unit, and a writing unit. The display displays a list of multiple combinations of multiple types of information synchronously played back as first information. The selecting unit selects a new combination of the multiple types of information from the combinations of the multiple types of information included in the first information displayed by the display. The writing unit writes out the combination of the multiple types of information selected by the selecting unit as second information synchronously played back.

10 Claims, 11 Drawing Sheets

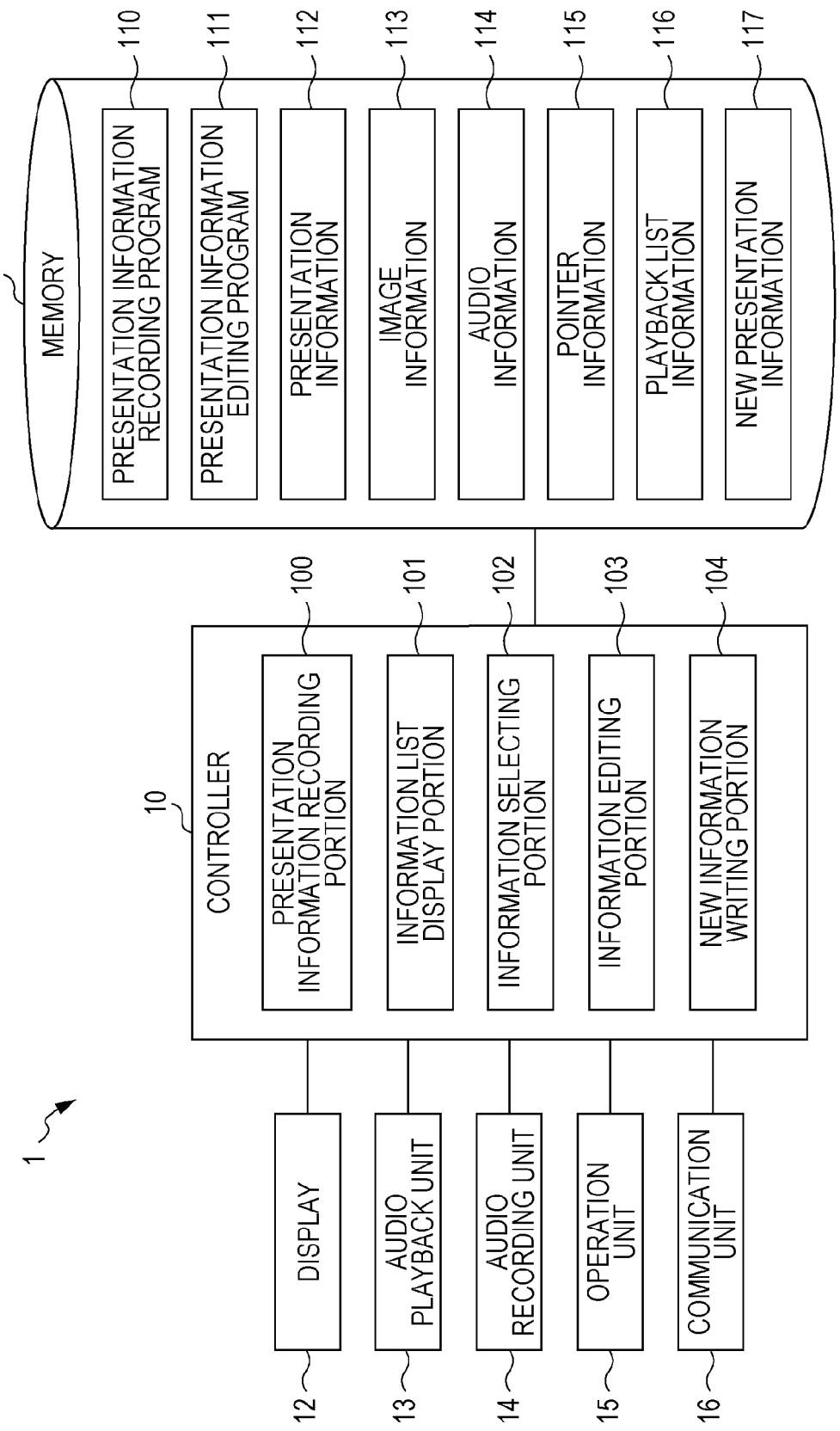

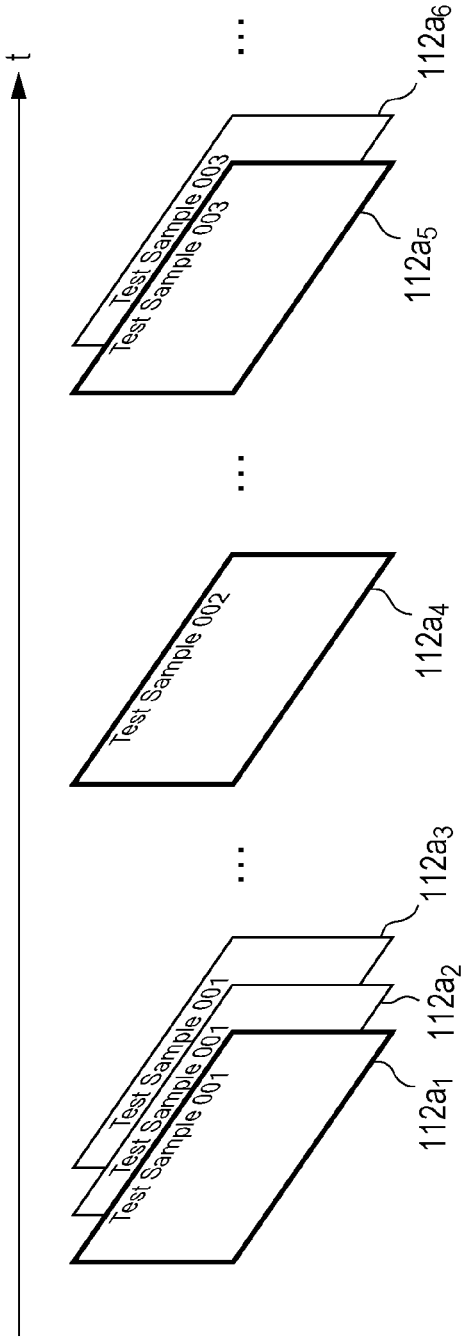
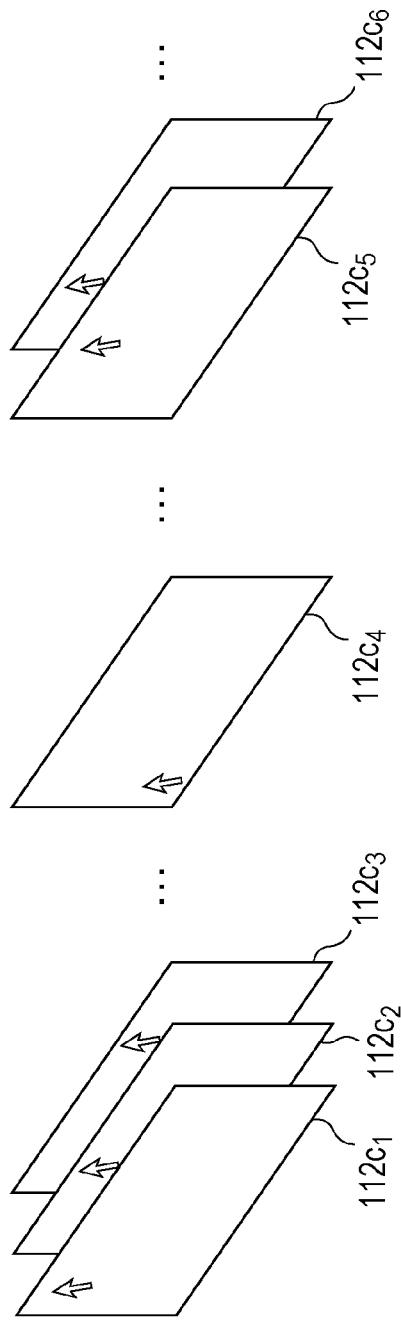
FIG. 2A
FIG. 2B
FIG. 2C

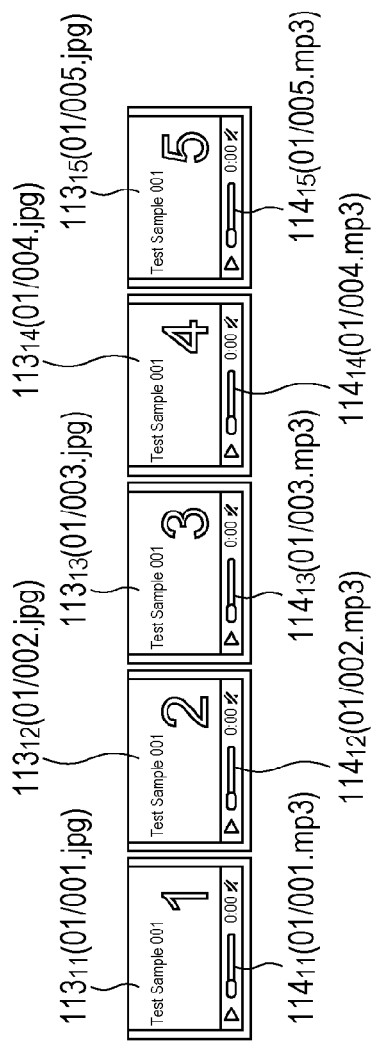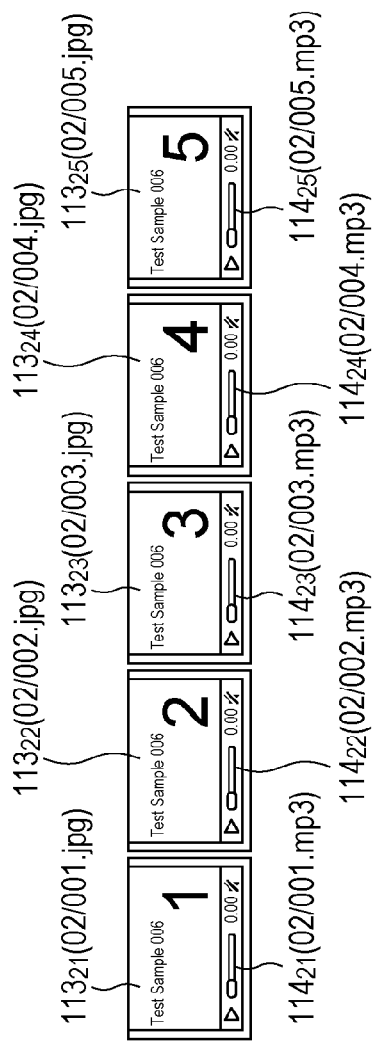

$116_{3temp}$

```
<tmp_list>
 <cid>03</cid>
 <items>
   <item pic= "01/002.jpg" sound = "01/002.mp3" />
   <item pic= "02/001.jpg" sound = "02/001.mp3" />
   <item pic= "01/001.jpg" sound = "02/002.mp3" />
 </items>
</tmp_list>
```

$116_3$

```
<list>
 <cid>03</cid>
 <items>
   <item pic= "001.jpg" sound = "001.mp3" />
   <item pic= "002.jpg" sound = "002.mp3" />
   <item pic= "003.jpg" sound = "003.mp3" />
 </items>
</list>
```

FIG. 10A

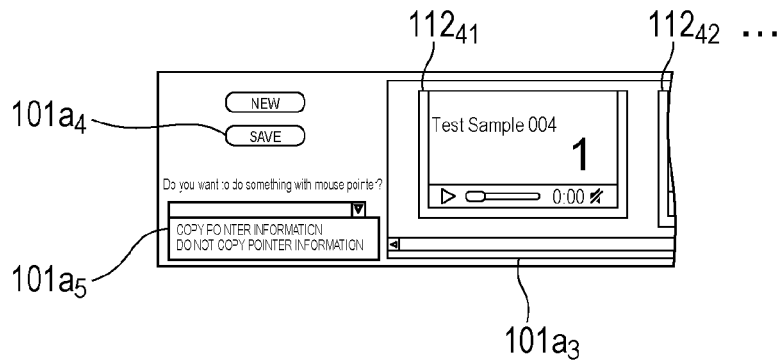

FIG. 10B

```
<list>
 <cid>04</cid>
 <items>
    <item pic= "001.jpg" sound = "001.mp3" mouse= "pointer001.xml" />
    <item pic= "002.jpg" sound = "002.mp3" mouse= "pointer002.xml" />
    <item pic= "003.jpg" sound = "003.mp3" mouse= "pointer003.xml" />
    <item pic= "004.jpg" sound = "004.mp3" mouse= "pointer004.xml" />
    <item pic= "005.jpg" sound = "005.mp3" mouse= "pointer005.xml" />
 </items>
</list>
```
$116_4$

FIG. 10C  $115_{41}$

```
<POINTER interval="0.1">
 <POINT_SET>
 <POINT t="0.00" x="665" y="213" />
 <POINT t="0.06" x="673" y="243" />
 <POINT t="0.13" x="685" y="276" />
 <POINT t="0.19" x="696" y="300" />
 <POINT t="0.26" x="707" y="331" />
 <POINT t="0.32" x="714" y="342" />
 <POINT t="0.38" x="722" y="339" />
 <POINT t="0.45" x="753" y="325" />
 <POINT t="0.51" x="782" y="309" />
 <POINT t="0.68" x="791" y="305" />
 <POINT t="0.85" x="794" y="307" />
 <POINT t="1.02" x="808" y="318" />
 </POINT_SET>
<POINTER>
```

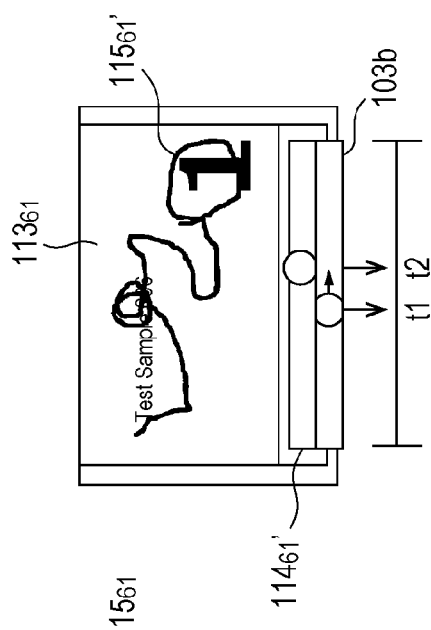
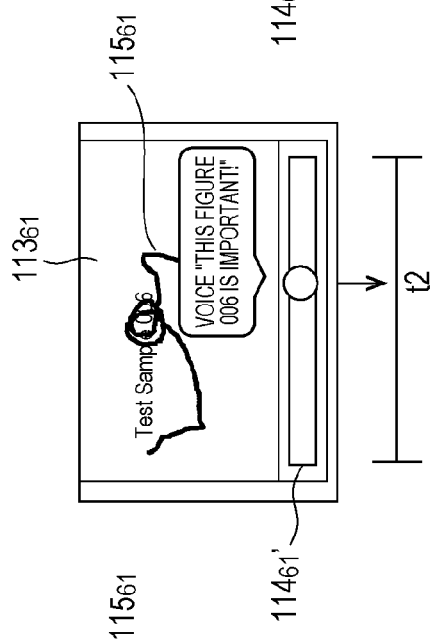
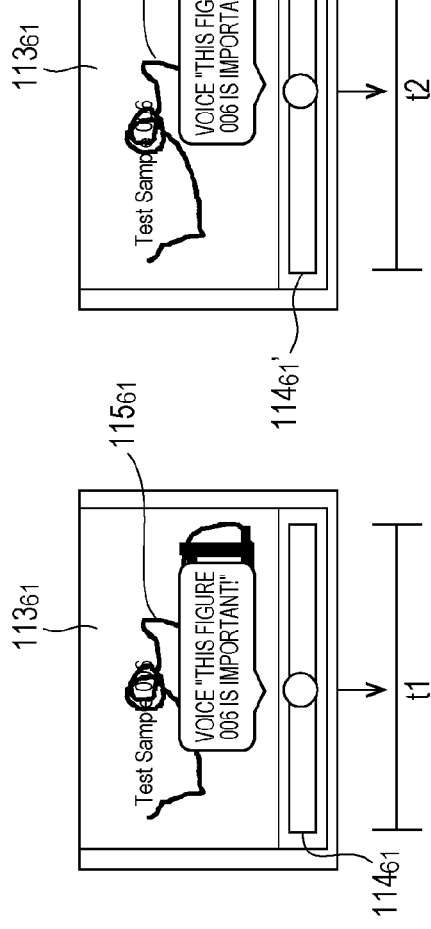
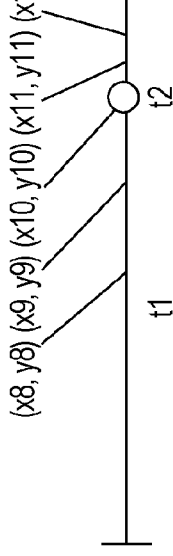
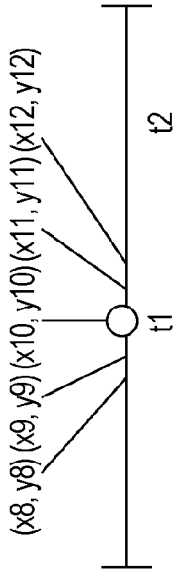

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-091533 filed Apr. 24, 2013.

BACKGROUND

Technical Field

The present invention relates to an information processing apparatus, an information processing method, and a non-transitory computer readable medium.

SUMMARY

According to an aspect of the invention, there is provided an information processing apparatus including a display, a selecting unit, and a writing unit. The display displays a list of multiple combinations of multiple types of information synchronously played back as first information. The selecting unit selects a new combination of the multiple types of information from the combinations of the multiple types of information included in the first information displayed by the display. The writing unit writes out the combination of the multiple types of information selected by the selecting unit as second information synchronously played back.

BRIEF DESCRIPTION OF THE DRAWINGS

Exemplary embodiments of the present invention will be described in detail based on the following figures, wherein:

FIG. 1 is a block diagram illustrating an exemplary configuration of an information processing apparatus according to an exemplary embodiment;

FIGS. 2A to 2C are schematic views for illustrating an example of the structure of presentation information;

FIGS. 3A1 and 3A2 and FIGS. 3B1 and 3B2 are schematic views for illustrating examples of the structures of the presentation information and playback list information;

FIGS. 10A to 10C are schematic views for illustrating an example of an operation to select pointer information by the information processing apparatus;

FIGS. 12A1 to 12A3 and FIGS. 12B1 and 12B2 are schematic views for illustrating another example of the editing operation by the information processing apparatus.

DETAILED DESCRIPTION

Exemplary Embodiments

Configuration of Information Processing Apparatus

Figure 4:
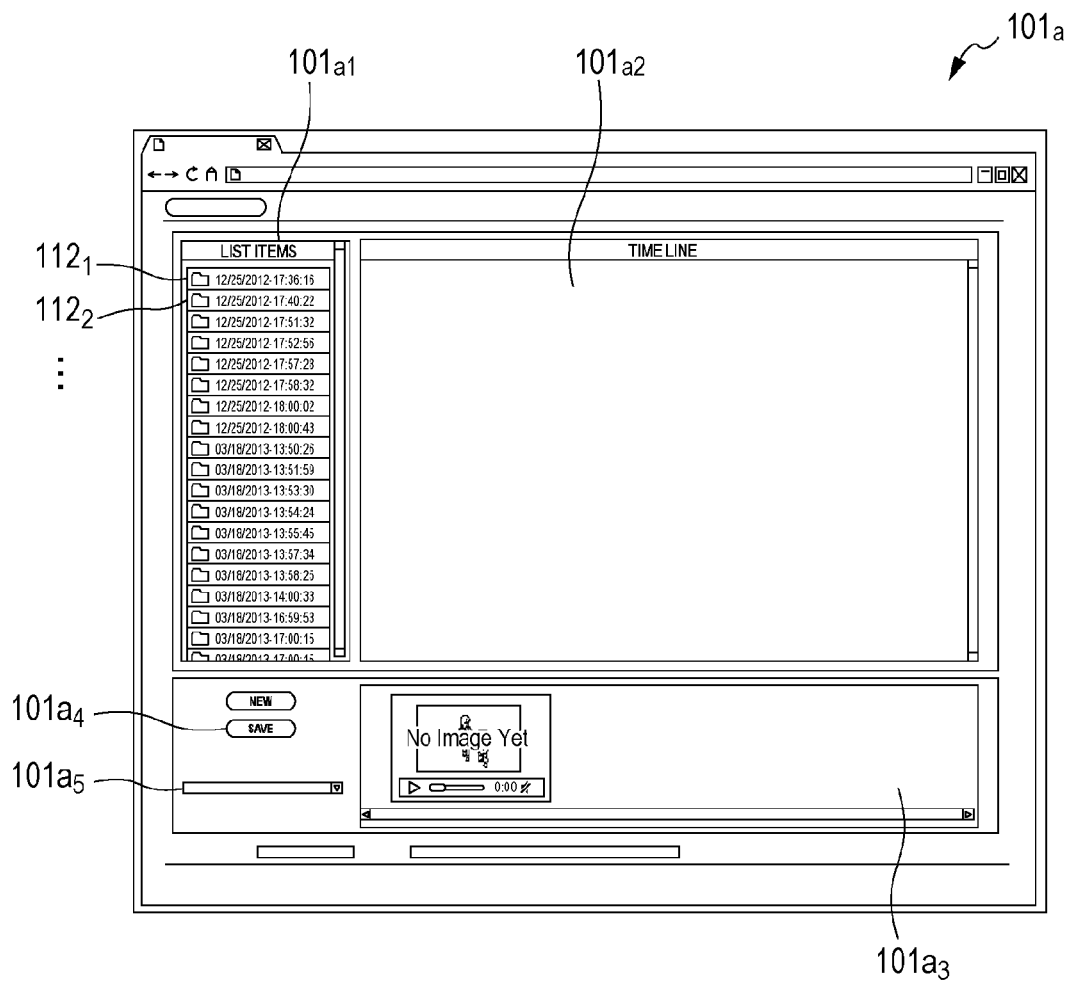
FIG. 4 is a schematic view for illustrating an example of a selection operation by the information processing apparatus.

FIG. 1 is a block diagram illustrating an exemplary configuration of an information processing apparatus 1 according to an exemplary embodiment.

Referring to FIG. 1, the information processing apparatus 1 records, plays back and edits the content of presentation as presentation information 112 and is composed of, for example, a central processing unit (CPU). The information processing apparatus 1 includes a controller 10, a memory 11, a display 12, an audio playback unit 13, an audio recording unit 14, an operation unit 15, and a communication unit 16. The controller 10 controls the components and executes various programs. The memory 11 is composed of a storage medium, such as a flash memory, and stores information. The display 12 displays characters, an image, and so on. The audio playback unit 13 plays back the sound in the presentation information 112. The audio recording unit 14 records the sound in the presentation information 112. The operation unit 15 is used to operate the information processing apparatus 1. The communication unit 16 communicates with an external apparatus via a network. The recording and the playback of the presentation information 112 may be performed by an external apparatus.

The controller 10 executes a presentation information recording program 110 described below to function as a presentation information recording portion 100. The controller 10 executes a presentation information editing program 111 described below to function as, for example, an information list display portion 101, an information selecting portion 102, an information editing portion 103, and a new information writing portion 104.

The presentation information recording portion 100 records the presentation information 112 as first information. The presentation information 112 includes multiple types of information. Specifically, the presentation information 112 includes image information 113, audio information 114, and pointer information 115 as the multiple types of information. The image information 113 is used to display multiple pages in document information in time series. The audio information 114 is used to provide audio description of each page recorded in synchronization with the image information 113. The pointer information 115 is instruction information used to indicate each page recorded in synchronization with the image information 113 with, for example, a cursor pointer. The timing when each page in the document information is displayed and the position of the cursor pointer in the pointer information 115 are determined in response to the content of an operation by a user who gives the presentation with the operation unit 15, and the audio information 114 is recorded by the audio recording unit 14. The timing when each page in the document information is displayed may be determined in response to an operation with the operation unit 15 or the respective pages in the document information may be automatically fed at predetermined timing. The "document information" is composed of characters, images, and so on generated by, for example, presentation software and the multiple pages may include multiple slides.

The presentation information recording portion 100 generates playback list information 116, which indicates the playback order of the image information 113, the audio information 114, and the pointer information 115 that are played back at the same playback time zone. Each of the image information 113, the audio information 114, and the pointer information 115 will be described in detail below with reference to FIGS. 2A to 2C and FIGS. 3A1 to 3B2 and in their descriptions.

The information list display portion 101 visually displays a list of multiple pieces of presentation information 112 by using the image information 113, the audio information 114, and the pointer information 115 corresponding to each piece of presentation information 112. A method of displaying the list of the multiple pieces of presentation information 112 will be described in detail below with reference to FIGS. 3A1 to 11C and in their descriptions.

The information selecting portion 102 selects information to be included in new presentation information 117 described below from the image information 113, the audio information 114, and the pointer information 115 displayed by the information list display portion 101 in response to the content of an operation with the operation unit 15.

The information editing portion 103 edits the information selected by the information selecting portion 102. The content of editing will be described in detail below with reference to FIGS. 11A to 12B2 and in their descriptions.

The new information writing portion 104 writes out the new presentation information 117 from the information selected by the information selecting portion 102 as second information.

The memory 11 stores the presentation information recording program 110 causing the controller 10 to operate as the presentation information recording portion 100 and stores, for example, the presentation information editing program 111, the presentation information 112, the image information 113, the audio information 114, the pointer information 115, the playback list information 116, and the new presentation information 117 causing the controller 10 to operate as the information list display portion 101, the information selecting portion 102, the information editing portion 103, and the new information writing portion 104.

FIGS. 2A to 2C are schematic views for illustrating an example of the structure of the presentation information 112.

Upon playback of the presentation information 112, the image information 113 is displayed as frames $112a_1$ to $112a_6$, ... displaying the respective pages in the document in time series, the audio information 114 is played back as sounds $112b_1$, $112b_4$, and $112b_5$, ... providing the audio description of the respective pages recorded in synchronization with the image information 113, and the pointer information 115 is displayed as frames $112c_1$ to $112c_6$, ... indicating the respective pages recorded in synchronization with the image information 113 with the cursor pointer or the like. In each of the frames $112c_1$ to $112c_6$, an area excluding the cursor pointer is transparent and the frames $112c_1$ to $112c_6$, ... are superposed on the frames $112a_1$ to $112a_6$, ..., respectively, to be displayed.

The frames $112a_1$, $112a_4$, and $112a_5$ at times when the page of the document is switched, in the frames in the image information 113, are displayed as thumbnails by the information list display portion 101 in manners illustrated in FIG. 3A1 and FIG. 3B1.

The presentation information recording portion 100 divides the audio information 114 into the sounds $112b_1$, $112b_4$, and $112b_5$, ... at the times of the frames $112a_1$, $112a_4$, and $112a_5$, ... in the image information 113, respectively. The information resulting from the division is displayed as audio bars $114_{11}$ to $114_{15}$, ... by the information list display portion 101 in the manner illustrated in FIG. 3A1. The presentation information recording portion 100 also divides the pointer information 115 into the frame $112c_1$ to $112c_6$, ... (described in detail below with reference to FIGS. 10A to 10C).

FIGS. 3A1, 3A2, 3B1, and 3B2 are schematic views for illustrating examples of the structures of the presentation information 112 and the playback list information 116.

FIG. 3A1 illustrates thumbnails $113_{11}$ to $113_{15}$ corresponding to the image information 113 having a title identifier "01" for identifying the presentation information 112 and the audio bars $114_{11}$ to $114_{15}$ corresponding to the audio information 114 having the title identifier "01" for identifying the presentation information 112. Since the thumbnails $113_{11}$ to $113_{15}$ and the audio bars $114_{11}$ to $114_{15}$ belong to the same playback time zone, the thumbnails $113_{11}$ to $113_{15}$ are displayed in association with the audio bars $114_{11}$ to $114_{15}$, respectively.

When multiple pieces of presentation information 112 exist, an individual piece of presentation information is referred to as a "title." The image information 113, the audio information 114, and the pointer information 115 included in each title is each referred to as an "item."

The correspondence between the thumbnails $113_{11}$ to $113_{15}$ and the audio bars $114_{11}$ to $114_{15}$ illustrated in FIG. 3A1 is defined by a playback list $116_1$ illustrated in FIG. 3A2.

The playback list $116_1$ is described between "<list>" and "</list>" and includes the title identifier "01" defined between "<cid>" and "</cid>" and the items (the image information 113, the audio information 114, and the pointer information 115) that are defined between "<items>" and "</items>" and that are included in the playback list. The specific content of each item is described with "pic" indicating the file name of the image information 113 and "sound" indicating the file name of the audio information 114. Although the pointer information is not indicated in the examples illustrated in FIG. 3A1 to FIG. 3B2, addition of the pointer information will be described below with reference to FIGS. 10A to 10C and in their descriptions.

Specifically, the thumbnail $113_{11}$ in the image information 113 the file name of which is "001.jpg" is combined with the audio bar $114_{11}$ in the audio information 114 the file name of which is "001.mp3", the thumbnail $113_{12}$ in the image information 113 the file name of which is "002.jpg" is combined with the audio bar $114_{12}$ in the audio information 114 the file name of which is "002.mp3", the thumbnail $113_{13}$ in the image information 113 the file name of which is "003.jpg" is combined with the audio bar $114_{13}$ in the audio information 114 the file name of which is "003.mp3", the thumbnail $113_{14}$ in the image information 113 the file name of which is "004.jpg" is combined with the audio bar $114_{14}$ in the audio information 114 the file name of which is "004.mp3", and the thumbnail $113_{15}$ in the image information 113 the file name of which is "005.jpg" is combined with the audio bar $114_{15}$ in the audio information 114 the file name of which is "005.mp3." The playback list $116_1$ is described so that the thumbnails and the audio bars are played back in the order described above.

FIG. 3B1 illustrates thumbnail $113_{21}$ to $113_{25}$ corresponding to the image information 113 having a title identifier "02" for identifying the presentation information 112 and audio bars $114_{21}$ to $114_{25}$ corresponding to the audio information 114 having the title identifier "02" for identifying the presentation information 112. Since the thumbnails $113_{21}$ to $113_{25}$ and the audio bar $114_{21}$ to $114_{25}$ belong to the same playback time zone, the thumbnails $113_{21}$ to $113_{25}$ are displayed in association with the audio bars $114_{21}$ to $114_{25}$, respectively.

The correspondence between the thumbnails $113_{21}$ to $113_{25}$ and the audio bars $114_{21}$ to $114_{25}$ illustrated in FIG. 3B1 is defined by a playback list $116_2$ illustrated in FIG. 3B2. The specific content of the playback list $116_2$ is the same as that of the playback list $116_1$.

(Operations of Information Processing Apparatus)

Operations of the information processing apparatus 1 according to the present exemplary embodiment will now be described in (1) a basic operation, (2) a selection operation, (3) a write operation, and (4) an editing operation with reference to the drawings.

(1) Basic Operation

First, the user operates the operation unit 15 in the information processing apparatus 1 in order to record the content of presentation.

The presentation information recording portion 100 in the information processing apparatus 1 starts the recording of the presentation.

The information processing apparatus 1 executes a presentation application (not illustrated) to display the content of the document information in the display 12 and, for example, switches the page in response to the content of an operation with the operation unit 15.

The user orally describes the content of the document information displayed in the display 12 and points a portion corresponding to the description of the document information displayed in response to the operation with the operation unit 15 with the cursor pointer.

The presentation information recording portion 100 in the information processing apparatus 1 records the presentation at a time when the image displayed by the application is switched to generate the image information 113. In addition, the presentation information recording portion 100 records the voice orally described by the user via the audio recording unit 14 to generate the audio information 114. Furthermore, the presentation information recording portion 100 records images of the cursor pointer at a predetermined frame rate to generate the pointer information 115.

The presentation information recording portion 100 records information including the image information 113, the audio information 114, and the pointer information 115 as the presentation information 112.

The presentation information recording portion 100 generates the playback list information 116, which indicates the playback order of the image information 113, the audio information 114, and the pointer information 115.

(2) Selection Operation

The user extracts the presentation information during part of the playback time zone or freely combines the image information 113, the audio information 114, and the pointer information 115 in multiple titles on the basis of the recorded presentation information 112 to generate the new presentation information 117 as new information.

An operation to select multiple titles on which the new presentation information 117 is based from the presentation information 112 will now be described.

The user operates the operation unit 15 to request display of candidates for the multiple titles.

The information list display portion 101 in the information processing apparatus 1 displays a list image in response to the request from the user.

FIG. 4 is a schematic view for illustrating an example of the selection operation by the information processing apparatus.

Referring to FIG. 4, a list image $101a$ includes a title list $101a_1$ in which multiple titles, which are candidates, are displayed, an item list $101a_2$ in which items included in the title selected from the title list $101a_1$ are displayed, and a new title item list $101a_3$ in which each item selected from the item list $101a_2$ as an item to be used for a new title is displayed.

First, the information list display portion 101 displays multiple titles $112_1$, $112_2$, . . . in the presentation information 112 in the title list $101a_1$ in the manner illustrated in FIG. 4.

The user operates the operation unit 15, for example, so that multiple titles $112_1$, $112_4$, and $112_6$ are selected from the title list $101a_1$.

The information selecting portion 102 selects the titles $112_1$, $112_4$, and $112_6$ in response to the operation with the operation unit 15.

Figure 5:
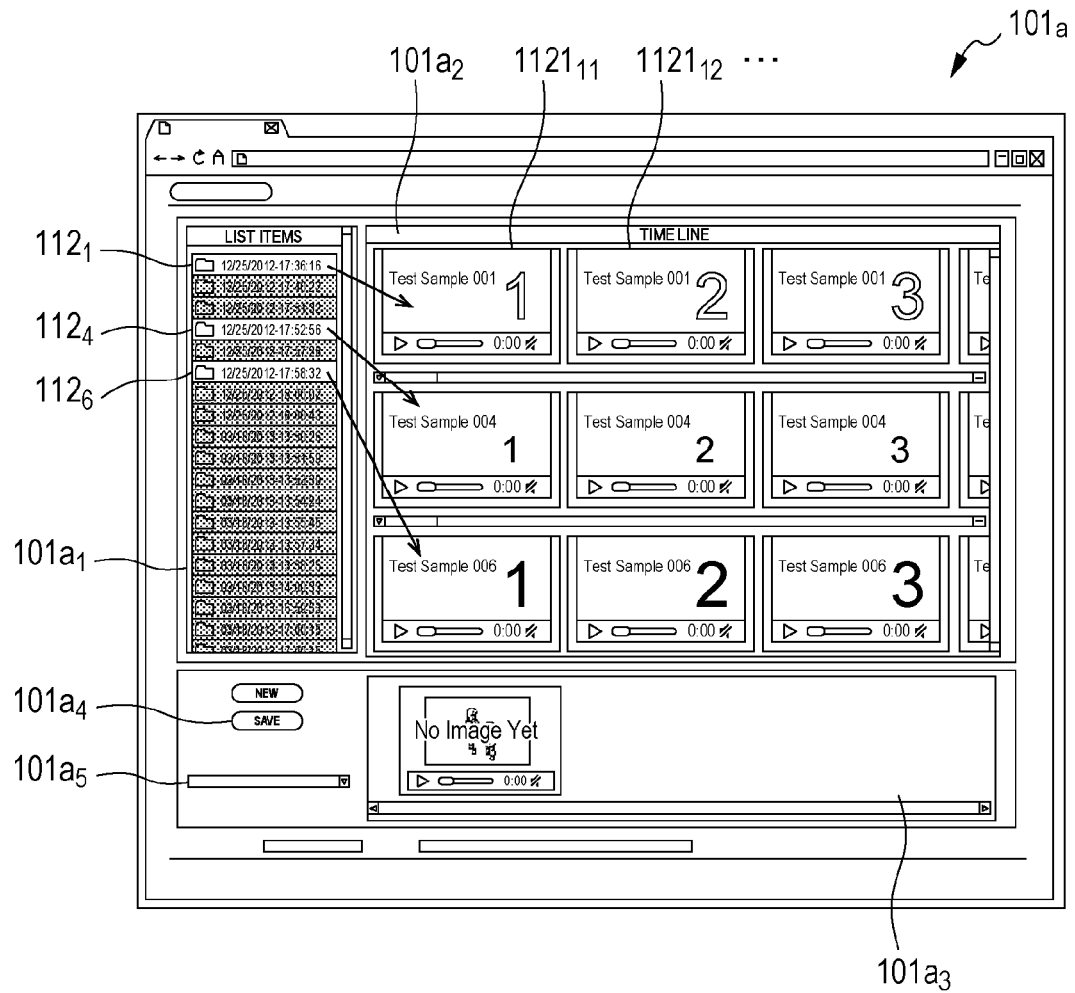
FIG. 5 is a schematic view for illustrating another example of the selection operation by the information processing apparatus.

FIG. 5 is a schematic view for illustrating another example of the selection operation by the information processing apparatus.

As illustrated in FIG. 5, the information list display portion 101 displays items $112_{11}$, $112_{12}$, . . . , $112_{41}$, $112_{42}$, . . . , $112_{61}$, $112_{62}$, . . . included in the titles $112_1$ $112_4$, and $112_6$ selected from the title list $101a_1$ in the item list $101a_2$.

Figure 6:
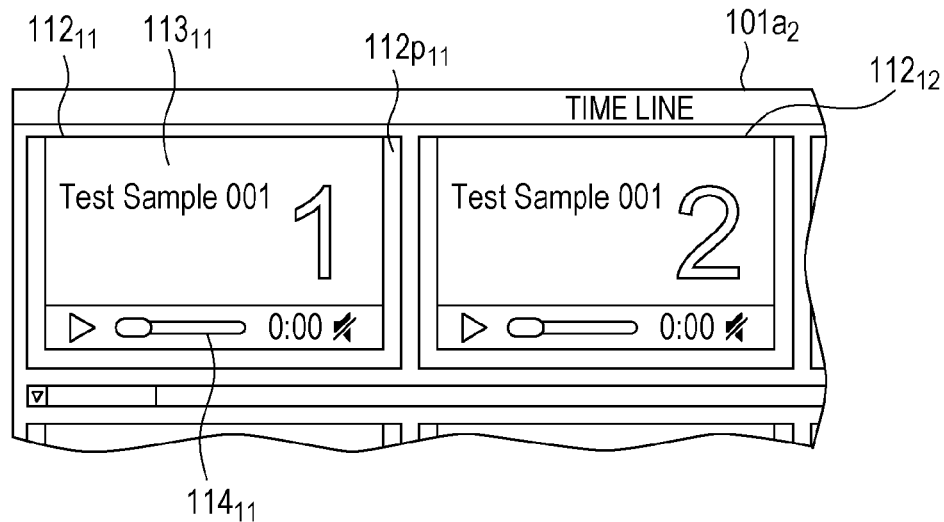
FIG. 6 is a schematic view for illustrating another example of the selection operation by the information processing apparatus.

FIG. 6 is a schematic view for illustrating another example of the selection operation by the information processing apparatus.

The item $112_{11}$ displayed in the item list $101a_2$ includes a plate $112p_{11}$ for selecting the entire item $112_{12}$, the thumbnail $113_{11}$ for selecting only the image information 113 in the item $112_{11}$, and the audio bar $114_{11}$ for selecting only the audio information 114 in the item $112_{11}$. Since the same structure applies to the other items $112_{12}$, item $112_{13}$, . . . , $112_{41}$, $112_{42}$, . . . , $112_{61}$, $112_{62}$, . . . , a description of these items is omitted herein.

The user operates the operation unit 15, for example, so that plates $112p_{11}$, $112p_{42}$, and $112p_{63}$ are selected for selecting multiple items $112_{11}$, $112_{42}$, and $112_{63}$, respectively, from the item list $101a_2$.

The information selecting portion 102 selects the items $112_{11}$, $112_{42}$, and $112_{63}$ in response to the operation with the operation unit 15.

Figure 7:
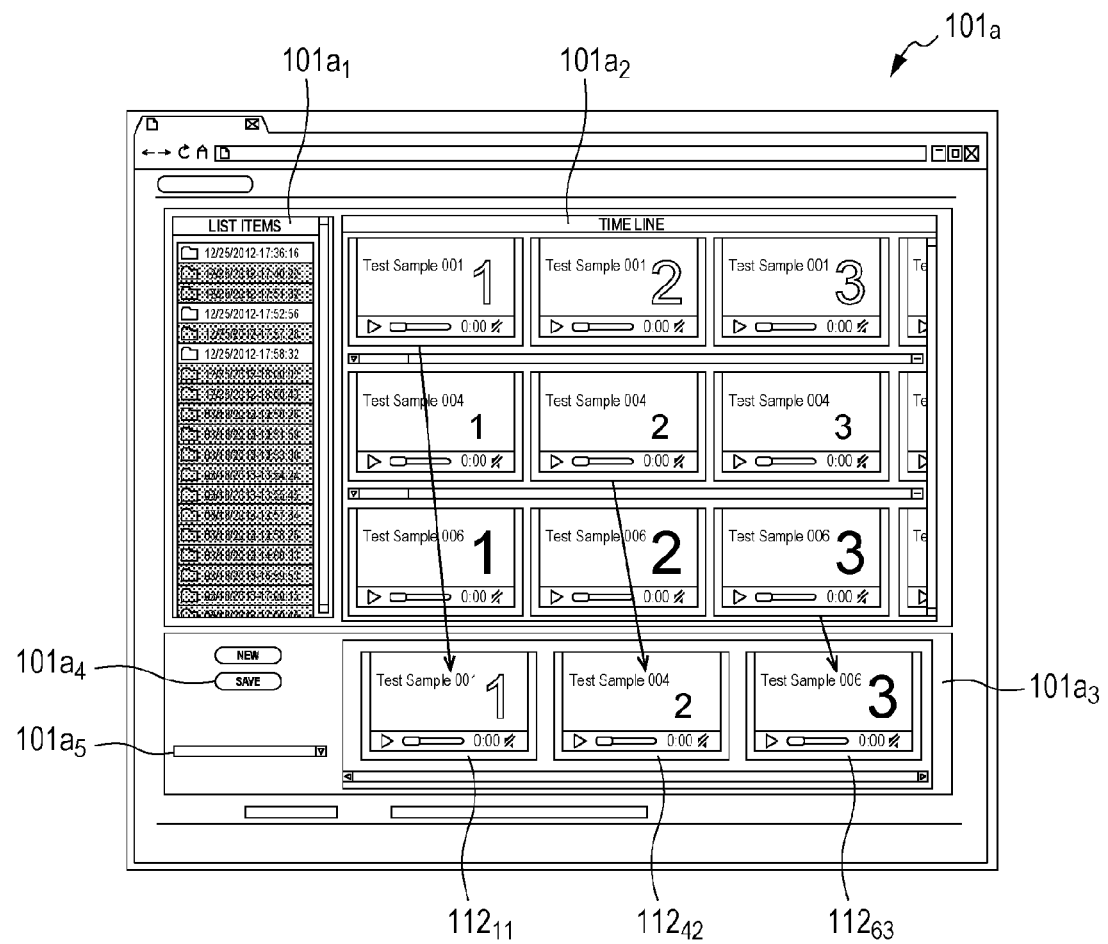
FIG. 7 is a schematic view for illustrating another example of the selection operation by the information processing apparatus.

FIG. 7 is a schematic view for illustrating another example of the selection operation by the information processing apparatus.

As illustrated in FIG. 7, the information list display portion 101 displays the items $112_{11}$, $112_{42}$, and $112_{63}$ selected from the item list $101a_2$ in the new title item list $101a_3$.

In another example, the user operates the operation unit 15, for example, so that the thumbnail $113_{11}$ and an audio bar $114_{42}$ are selected for selecting the thumbnail information about the item $112_{11}$ and the audio information about the item $112_{42}$, respectively, from the item list $101a_2$.

The information selecting portion 102 selects the thumbnail $113_{11}$ and the audio bar $114_{42}$ in response to the operation with the operation unit 15.

Figure 8:
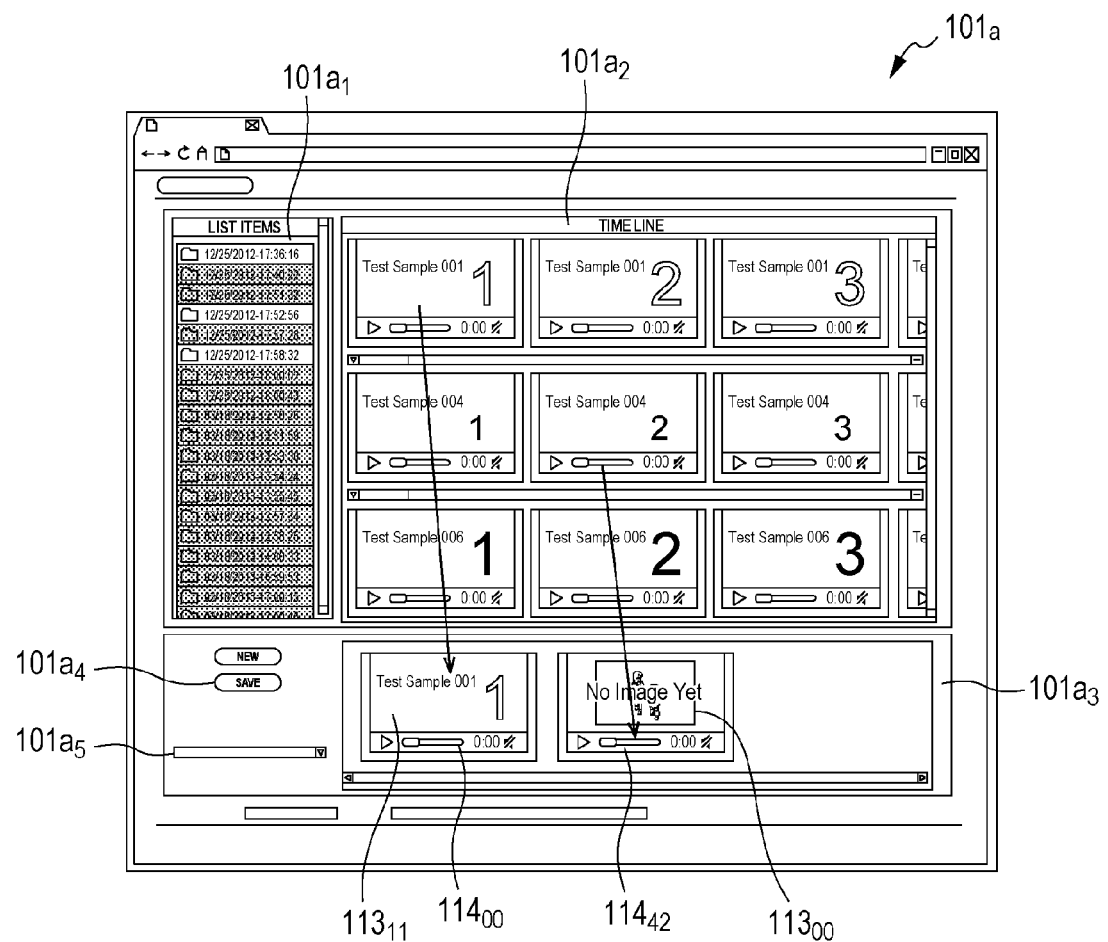
FIG. 8 is a schematic view for illustrating another example of the selection operation by the information processing apparatus.

FIG. 8 is a schematic view for illustrating another example of the selection operation by the information processing apparatus.

As illustrated in FIG. 8, the information list display portion 101 displays the thumbnail $113_{11}$ and the audio bar $114_{42}$ selected from the item list $101a_2$ in the new title item list $101a_3$.

If the audio information 114 to be combined with the image information 113 corresponding to the thumbnail $113_{11}$ is not selected, an audio bar $114_{00}$ in a state in which nothing is recorded is displayed, as illustrated in FIG. 8. The audio bar $114_{00}$ accepts recording of new information or selection of another audio bar. An audio bar in which silent sound is played back for a predetermined time period (for example, three minutes) may be displayed as an example of the audio bar $114_{00}$ in the state in which nothing is recorded. If the image information 113 to be combined with the audio information 114 corresponding to the audio bar $114_{42}$ is not selected, a thumbnail $113_{00}$ in a state in which no image is associated is displayed. The thumbnail $113_{00}$ accepts insertion of a page of new document information or selection of another piece of image information 113. An image including "No Image Yet" is displayed as an example of the thumbnail $113_{00}$.

As described above with reference to FIG. 7 and FIG. 8, upon selection of an item from the item list $101a_2$, the selected item is displayed in the new title item list $101a_3$.

When the user wants to write out a new title with the item displayed in the new title item list $101a_3$, the user writes out the title of the new presentation information 117 by the (3) Write operation described below.

(3) Write Operation

The user operates a Save button $101a_4$ in the list image $101a$ with the operation unit 15 to request writing out of a new title.

Upon acceptance of the request for writing out of a new title, the new information writing portion 104 writes out a new title with the item displayed in the new title item list $101a_3$ and stores the title in the new presentation information 117.

Figures 9A, 9B, 9C:
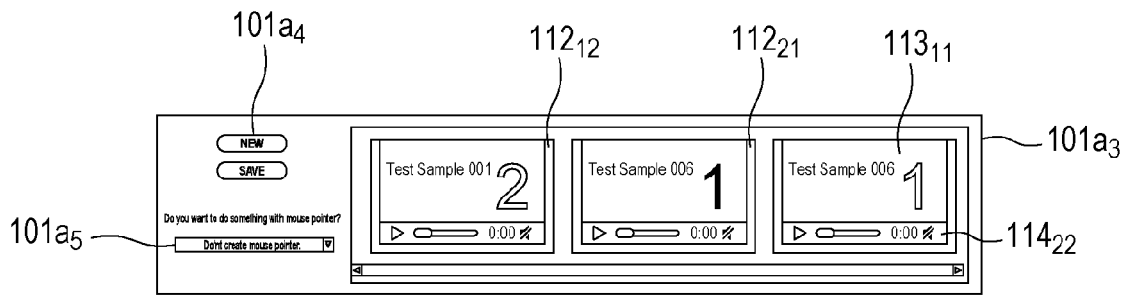
FIGS. 9A to 9C are schematic views for illustrating an example of a write operation by the information processing apparatus.

FIGS. 9A to 9C are schematic views for illustrating an example of the write operation by the information processing apparatus.

If the SAVE button $101a_4$ to write out a new title to store the title as the new presentation information 117 is not operated when the item $112_{12}$, an item $112_{21}$, and an item in which the thumbnail $113_{11}$ is combined with an audio bar $114_{22}$ are displayed in the new title item list $101a_3$, as illustrated in FIG. 9A, the identifiers of the original items: "01/002.jpg", "02/001.jpg" "01/001.jpg", "01/002.mp3", "02/001.mp3", and "02/002.mp3" are described as the items included in a temporary playback list $116_{3temp}$, as illustrated in FIG. 9B.

When the SAVE button $101a_4$ is operated, the identifiers of new items: "001.jpg", "002.jpg" "003.jpg", "001.mp3", "002.mp3", and "003.mp3" are described as the items included in a playback list $116_3$ of the titles of the new presentation information 117 that is stored, as illustrated in FIG. 9C.

Although the cases in which the image information 113 and the audio information 114 are processed as the items are described above, a case will now be described in which the pointer information 115 is processed.

FIGS. 10A to 10C are schematic views for illustrating an example of an operation to select the pointer information by the information processing apparatus.

When the items $112_{41}$, $112_{42}$, . . . are displayed in the new title item list $101a_3$, as illustrated in FIG. 10A, the user operates a pointer information pull-down menu $101a_5$ to determine whether the pointer information 115 corresponding to the items $112_{41}$, $112_{42}$, . . . is copied.

If "Copy pointer information" is selected from the pointer information pull-down menu $101a_5$, the information selecting portion 102 adds the pointer information in which "mouse" is described to the items in a playback list $116_4$, as illustrated in FIG. 10B.

As illustrated in FIG. 10C, for example, pointer information $115_{41}$ of the item $112_{41}$ is described between "<POINTER>" and "</POINTER>" and includes multiple combinations of times and coordinate points defined between "<POINT_SET>" and "</POINT_SET>." "POINTER interval" indicates the interval at which the coordinate points are recorded.

Although the case in which the pointer information 115 in the same playback time zone as that of the image information 113 or the audio information 114 is processed is described above, inconsistency may occur between the image information 113 or the audio information 114 and the pointer information 115 if the image information 113 or the audio information 114 is varied after the pointer information 115 is copied. In this case, the user edits the item by the (4) Editing operation described below.

(4) Editing Operation

A case will now be described in which the image information 113 is varied after the pointer information 115 is copied.

Figure 11A:
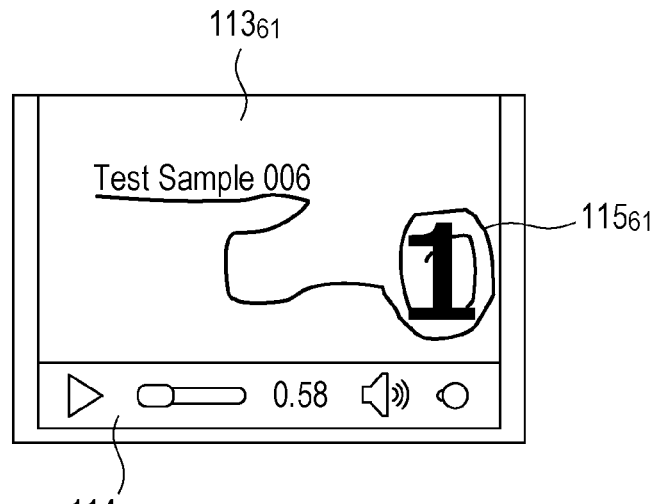
FIGS. 11A to 11C are schematic views for illustrating an example of an editing operation by the information processing apparatus.
Figure 11B:
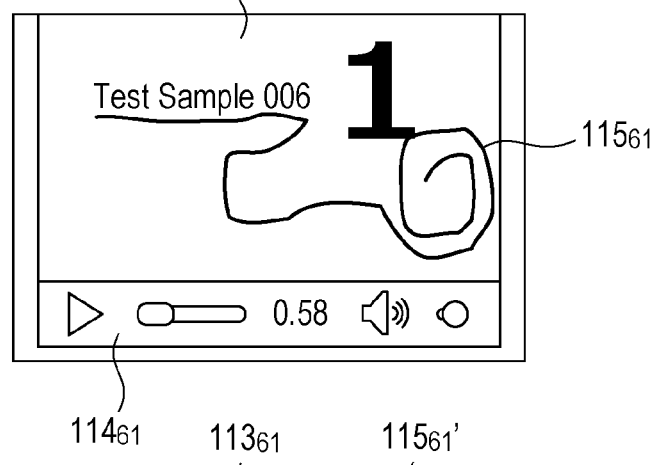
Figure 11C:
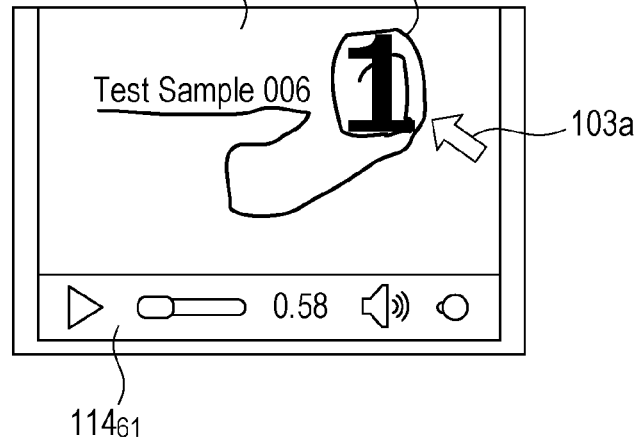

FIGS. 11A to 11C are schematic views for illustrating an example of the editing operation by the information processing apparatus.

A case will be described in which, after an item in which a thumbnail $113_{61}$, an audio bar $114_{61}$, and pointer information $115_{61}$ are combined with each other is selected, as illustrated in FIG. 11A, the image information 113 is changed from the thumbnail $113_{61}$ to a thumbnail $113_{61}'$, as illustrated in FIG. 11B. The pointer information $115_{61}$ is displayed by displaying points at all the coordinates recorded at predetermined interval and connecting the points that are temporally adjacent to each other.

Since the position of "1" in the thumbnail $113_{61}$ is moved in this case, the position pointed by the pointer information $115_{61}$ is shifted from the position of "1" in the thumbnail $113_{61}'$. Accordingly, the user operates the operation unit 15 to request editing of the pointer information $115_{61}$.

The information editing portion 103 displays an editing cursor $103a$ for moving the position of the pointer information $115_{61}$ in response to the request, as illustrated in FIG. 11C.

The user selects a point to be edited in the pointer information $115_{61}$ with the editing cursor $103a$, as illustrated in FIG. 11C, and moves the editing cursor $103a$ to a target position with the point being selected to edit the pointer information $115_{61}$.

The information editing portion 103 updates the content of the description on the basis of pointer information $115_{61}'$ after the moving. Although one point in the pointer information $115_{61}$ is moved with the editing cursor $103a$, moving points that are temporally adjacent to each other to some extent may produce a smooth path. The editing may be performed by selecting multiple points to move the points.

A case will now be described in which the audio information 114 is changed after the pointer information 115 is copied.

FIGS. 12A1 to 12A3 and FIGS. 12B1 and 12B2 are schematic views for illustrating another example of the editing operation by the information processing apparatus.

A case will be described in which, after an item in which the thumbnail $113_{61}$, the audio bar $114_{61}$, and the pointer information $115_{61}$ are combined with each other is selected, as illustrated in FIG. 12A1, the audio bar $114_{61}$ is updated with an audio bar $114_{61}'$, as illustrated in FIG. 12A2.

In the example in FIG. 12A1, since a positional coordinate (x10, y10) of "006" in the thumbnail $113_{61}$ is pointed by the pointer information $115_{61}$ at a time "t1" and voice "This Figure 006 is important!" in the audio bar $114_{61}$ is played back at the time "t1", the time when the positional coordinate is pointed with the pointer information $115_{61}$ coincides with the time when the voice is played back. In contrast, in the example in FIG. 12A2, since the voice "This Figure 006 is important!" in the audio bar $114_{61}$' is played back at a time "t2", the time when the positional coordinate is pointed with the pointer information $115_{61}$ is shifted from the time when the voice is played back. Accordingly, the user operates the operation unit 15 to request editing of the pointer information $115_{61}$.

The information editing portion 103 displays a pointer time adjustment bar 103b for changing the time pointed with the pointer information $115_{61}$ in response to the request, as illustrated in FIG. 12A3.

The user selects a point at the time corresponding to the positional coordinate (x10, y10) on the pointer time adjustment bar 103b, as illustrated in FIG. 12A3, and moves the pointer time adjustment bar 103b to a target time with the point being selected to edit the pointer information $115_{61}$.

The information editing portion 103 updates the content of the description on the basis of the pointer information $115_{61}$' after the moving. Although one point in the pointer information $115_{61}$ is moved with the editing cursor 103a from the state illustrated in FIG. 12B1 to the state illustrated in FIG. 12B2, moving points that are temporally adjacent to each other to some extent may produce a smooth path. The editing may be performed by selecting multiple times to move the times. The editing may be performed so that the content of the audio bar $114_{61}$' is matched with the content of the pointer information $115_{61}$.

Other Exemplary Embodiments

While the exemplary embodiments of the invention have been described above, it will be recognized and understood that the invention is not limited to these exemplary embodiments and that various modifications may be made in the invention within the spirit and scope of the invention. For example, instead of the audio information 114, movie information representing the document information may be used. For example, the pointer information 115 may indicate an annotation, such as a hand-written line, in addition to the movement of the mouse pointer. In addition to the times and the coordinates, the colors and/or thicknesses of lines may be recorded as the pointer information 115. The addition of the records is realized by, for example, adding description "color=red" in the case of the color of a line and description "thickness=3" in the case of the thickness of a line to the pointer information $115_{41}$ illustrated in FIG. 10C, in addition to the times and the coordinates. Also in editing of the annotation, the annotation may be displayed in the manners illustrated in FIGS. 11A to 12B2 to be edited, as in the normal pointer information.

Although the functions of the information list display portion 101, the information selecting portion 102, the information editing portion 103, and the new information writing portion 104 in the controller 10 are realized by the programs in the above exemplary embodiments, all or part of the portions may be realized by hardware, such as an application specific integrated circuit (ASIC). Alternatively, the programs used in the above exemplary embodiments may be recorded on a recording medium, such as a compact disk-read only memory (CD-ROM), for provision. Switching, deletion, addition, etc. of the steps described above in the exemplary embodiments may be performed within the spirit and scope of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display configured to display a list of a plurality of combinations of a plurality of types of information synchronously played back as first information;
   a selecting unit configured to select a new combination of the plurality of types of information from the combinations of the plurality of types of information included in the first information displayed by the display; and
   a writing unit configured to write out the combination of the plurality of types of information selected by the selecting unit as second information synchronously played back,
   wherein the first information includes a first combination of the plurality of types of information simultaneously played back,
   wherein the selecting unit is configured to select a new combination of the plurality of types of information simultaneously played back, and
   wherein the writing unit is configured to write out the new combination as the second information.

2. The information processing apparatus according to claim 1,
   wherein the first information at least includes image information, audio information that is played back in synchronization with the image information, and instruction information that is played back in synchronization with the image information and that indicates a point on the image information as the plurality of types of information.

3. The information processing apparatus according to claim 2,
   wherein the writing unit combines a plurality of combinations selected by the selecting unit with each other to write out the plurality of combinations as the second information synchronously played back.

4. The information processing apparatus according to claim 2, further comprising:
   an editing unit that partially or entirely varies the position indicated by the instruction information in the combination selected by the selecting unit for editing.

5. The information processing apparatus according to claim 1,
   wherein the writing unit combines a plurality of combinations selected by the selecting unit with each other to write out the plurality of combinations as the second information synchronously played back.

6. The information processing apparatus according to claim 1, further comprising:
   an editing unit that partially or entirely varies a playback time of any of the plurality of types of information in the combination selected by the selecting unit for editing.

7. A non-transitory computer readable medium storing a program causing a computer to execute a process comprising:
   displaying a list of a plurality of combinations of a plurality of types of information synchronously played back as first information;

selecting a new combination of the plurality of types of information from the combinations of the plurality of types of information included in the displayed first information; and writing out the selected combination of the plurality of types of information as second information synchronously played back, wherein the first information includes a first combination of the plurality of types of information simultaneously played back, wherein the selecting comprises selecting a new combination of the plurality of types of information simultaneously played back, and wherein the writing out comprises writing out the new combination as the second information.

8. An information processing apparatus comprising:

a display configured to display a list of at least two of image information that is played back, audio information that is played back in synchronization with the image information, instruction information that is played back in synchronization with the image information and that indicates a point on the image information as first information;

a selecting unit configured to select at least the image information and the instruction information or the audio information and the instruction information from the image information, the audio information, and the instruction information included in the first information displayed by the display; and a writing unit configured to write out the combination of the image information and the instruction information or the audio information and the instruction information, selected by the selecting unit, as second information synchronously played back, wherein the first information includes a first combination of the at least two of the image information, the audio information, and the instruction information that are simultaneously played back, wherein the selecting unit is configured to select a new combination of the at least two of the image information, the audio information, and the instruction information simultaneously played back, and wherein the writing unit is configured to write out the new combination as the second information.

9. An information processing method comprising:

displaying a list of a plurality of combinations of a plurality of types of information synchronously played back as first information;

selecting a new combination of the plurality of types of information from the combinations of the plurality of types of information included in the displayed first information; and writing out the selected combination of the plurality of types of information as second information synchronously played back, wherein the first information includes a first combination of the plurality of types of information simultaneously played back, wherein the selecting comprises selecting a new combination of the plurality of types of information simultaneously played back, and wherein the writing out comprises writing out the new combination as the second information.

10. An information processing method comprising:

displaying a list of at least two of image information that is played back, audio information that is played back in synchronization with the image information, instruction information that is played back in synchronization with the image information and that indicates a point on the image information as first information;

selecting at least the image information and the instruction information or the audio information and the instruction information from the image information, the audio information, and the instruction information included in the displayed first information; and writing out the selected combination of the image information and the instruction information or the audio information and the instruction information as second information synchronously played back, wherein the first information includes a first combination of the at least two of the image information, the audio information, and the instruction information that are simultaneously played back, wherein the selecting comprises selecting a new combination of the at least two of the image information, the audio information, and the instruction information simultaneously played back, and wherein the writing out comprises writing out the new combination as the second information.

\* \* \* \* \*